United States Patent
Jutzi (10) Patent No.: US 7,047,456 B2
(45) Date of Patent: May 16, 2006

(54) ERROR CORRECTION FOR REGIONAL AND DYNAMIC FACTORS IN COMMUNICATIONS

(75) Inventor: Curtis E. Jutzi, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 1023 days.

(21) Appl. No.: 09/941,433

(22) Filed: Aug. 28, 2001

(65) Prior Publication Data

US 2003/0046708 A1    Mar. 6, 2003

(51) Int. Cl.
*G01R 31/28* (2006.01)

(52) U.S. Cl. ...................... 714/712; 714/751

(58) Field of Classification Search ................ 330/129; 370/484, 316; 702/107; 710/35; 714/712, 714/751

See application file for complete search history.

(56) References Cited

U.S. PATENT DOCUMENTS

| | | | |
|---|---|---|---|
| 4,602,279 A | 7/1986 | Freeman | |
| 5,075,771 A | 12/1991 | Hashimoto | |
| 5,155,591 A | 10/1992 | Wachob | |
| 5,392,223 A | 2/1995 | Caci | |
| 5,410,272 A * | 4/1995 | Haberland et al. | 330/129 |
| 5,410,344 A | 4/1995 | Graves et al. | |
| 5,444,499 A | 8/1995 | Saitoh | |
| 5,446,919 A | 8/1995 | Wilkins | |
| 5,483,278 A | 1/1996 | Strubbe et al. | |
| 5,483,529 A * | 1/1996 | Baggen et al. | 370/484 |
| 5,534,911 A | 7/1996 | Levitan | |
| 5,559,549 A | 9/1996 | Hendricks et al. | |
| 5,564,088 A | 10/1996 | Saitoh | |
| 5,566,174 A | 10/1996 | Sato et al. | |
| 5,585,838 A | 12/1996 | Lawler et al. | |
| 5,600,364 A | 2/1997 | Hendricks et al. | |
| 5,619,247 A | 4/1997 | Russo | |
| 5,654,747 A | 8/1997 | Ottesen et al. | 725/1 |
| 5,664,091 A | 9/1997 | Keen | |
| 5,686,954 A | 11/1997 | Yoshinobu et al. | |
| 5,724,345 A | 3/1998 | Guarneri et al. | |
| 5,727,002 A | 3/1998 | Miller et al. | |

(Continued)

FOREIGN PATENT DOCUMENTS

EP    0902569 A1    3/1999

(Continued)

OTHER PUBLICATIONS

"Client Infrastructure for Internet-Based Data Services for Digital Television: Enabling a New Class of DTV Services", *Intel Architecture Labs*, (2000),1-10.

(Continued)

Primary Examiner—David Ton
(74) Attorney, Agent, or Firm—Blakely, Sokoloff, Taylor & Zafman LLP (57) ABSTRACT

In an aspect, a method and system is provided to receive and analyze tracked and reported broadcasted data errors, based on a path of the broadcasted data, regional factors including terrain, dynamic factors including weather and season, and retransmission factors. In an aspect, error correction is utilized, based on an analysis of the reported data errors. In an aspect, a method and system is provided to receive broadcast data, and track and report data errors based on a path of the received data, regional factors including terrain, dynamic factors including weather and season, and retransmission factors. In an aspect, data is received having error correction based on an analysis of the reported data errors.

40 Claims, 5 Drawing Sheets

U.S. PATENT DOCUMENTS

| | | | |
|---|---|---|---|
| 5,751,282 A | 5/1998 | Girard et al. | |
| 5,768,681 A | 6/1998 | Dan et al. | |
| 5,778,182 A | 7/1998 | Cathey et al. | |
| 5,790,935 A | 8/1998 | Payton | |
| 5,801,753 A | 9/1998 | Eyer et al. | |
| 5,838,678 A | 11/1998 | Davis et al. | |
| 5,867,799 A | 2/1999 | Lang et al. | |
| 5,897,608 A * | 4/1999 | Yokoyama et al. | 702/107 |
| 5,920,700 A | 7/1999 | Gordon et al. | |
| 5,930,493 A | 7/1999 | Ottesen et al. | |
| 5,937,411 A | 8/1999 | Becker | |
| 5,940,738 A | 8/1999 | Rao | |
| 5,945,988 A | 8/1999 | Williams et al. | |
| 5,973,683 A | 10/1999 | Cragun et al. | |
| 5,977,964 A | 11/1999 | Williams et al. | |
| 5,991,841 A | 11/1999 | Gafken et al. | |
| 5,999,526 A | 12/1999 | Garland et al. | |
| 6,002,393 A | 12/1999 | Hite et al. | |
| 6,002,852 A | 12/1999 | Birdwell et al. | |
| 6,005,597 A | 12/1999 | Barrett et al. | |
| 6,006,247 A | 12/1999 | Browning et al. | |
| 6,018,768 A | 1/2000 | Ullman et al. | |
| 6,020,883 A | 2/2000 | Herz et al. | |
| 6,021,433 A | 2/2000 | Payne et al. | |
| 6,055,560 A | 4/2000 | Mills et al. | |
| 6,088,722 A | 7/2000 | Herz et al. | |
| 6,108,645 A | 8/2000 | Eichstaedt et al. | |
| 6,114,376 A | 9/2000 | Prichard et al. | |
| 6,119,189 A | 9/2000 | Gafken et al. | |
| 6,125,259 A | 9/2000 | Perlman | |
| 6,131,127 A | 10/2000 | Gafken et al. | |
| 6,144,376 A | 11/2000 | Connelly | |
| 6,148,005 A | 11/2000 | Paul et al. | |
| 6,160,989 A | 12/2000 | Hendricks et al. | |
| 6,184,918 B1 | 2/2001 | Goldschmidt Iki et al. | |
| 6,215,776 B1 * | 4/2001 | Chao | 370/316 |
| 6,279,040 B1 | 8/2001 | Ma et al. | |
| 6,289,012 B1 | 9/2001 | Harrington et al. | |
| 6,289,510 B1 | 9/2001 | Nakajima | |
| 6,298,482 B1 | 10/2001 | Seidman et al. | 725/101 |
| 6,304,578 B1 | 10/2001 | Fluss | |
| 6,317,881 B1 | 11/2001 | Shah-Nazaroff et al. | |
| 6,320,850 B1 | 11/2001 | Perahia et al. | |
| 6,349,321 B1 | 2/2002 | Katayama | |
| 6,359,557 B1 | 3/2002 | Bilder | |
| 6,359,571 B1 | 3/2002 | Endo et al. | |
| 6,374,405 B1 | 4/2002 | Willard | |
| 6,378,036 B1 | 4/2002 | Lerman et al. | |
| 6,389,593 B1 | 5/2002 | Yamagishi | |
| 6,397,387 B1 | 5/2002 | Rosin et al. | |
| 6,424,625 B1 | 7/2002 | Larsson et al. | |
| 6,434,747 B1 | 8/2002 | Khoo et al. | |
| 6,449,632 B1 | 9/2002 | David et al. | |
| 6,457,010 B1 | 9/2002 | Eldering et al. | |
| 6,460,036 B1 | 10/2002 | Herz | |
| 6,467,089 B1 | 10/2002 | Aust et al. | |
| 6,480,783 B1 | 11/2002 | Myr | |
| 6,490,722 B1 | 12/2002 | Barton et al. | 717/174 |
| 6,513,069 B1 | 1/2003 | Abato et al. | |
| 6,526,455 B1 | 2/2003 | Kamimura | |
| 6,529,526 B1 | 3/2003 | Schneidewend | 370/486 |
| 6,557,042 B1 | 4/2003 | He et al. | |
| 6,570,843 B1 | 5/2003 | Wolfgang | |
| 6,571,389 B1 | 5/2003 | Spyker et al. | |
| 6,574,518 B1 | 6/2003 | Lounsberry et al. | |
| 6,578,199 B1 | 6/2003 | Tsou et al. | |
| 6,594,682 B1 | 7/2003 | Peterson et al. | |
| 6,601,237 B1 | 7/2003 | Ten Kate et al. | 724/47 |
| 6,617,980 B1 | 9/2003 | Endo et al. | |
| 6,678,890 B1 | 1/2004 | Cai | |
| 6,715,004 B1 * | 3/2004 | Grimsrud et al. | 710/35 |
| 2001/0012299 A1 | 8/2001 | Dahlen | |
| 2001/0013127 A1 | 8/2001 | Tomita | |
| 2001/0037507 A1 | 11/2001 | Mori | |
| 2002/0112235 A1 | 8/2002 | Ballou et al. | 725/25 |
| 2002/0199194 A1 | 12/2002 | Ali | 725/46 |
| 2003/0056216 A1 | 3/2003 | Wugofski et al. | 725/46 |
| 2003/0074664 A1 | 4/2003 | Kwoh | 725/48 |
| 2003/0097657 A1 | 5/2003 | Zhou et al. | 725/46 |
| 2004/0123323 A1 | 6/2004 | Russo | 725/88 |
| 2004/0163014 A1 | 8/2004 | Schein et al. | 725/13 |
| 2004/0221307 A1 | 11/2004 | Arai et al. | |
| 2005/0155063 A1 | 7/2005 | Bayrakeri et al. | |

FOREIGN PATENT DOCUMENTS

| | | |
|---|---|---|
| EP | 1028551 | 8/2000 |
| EP | 1 043 892 A1 | 10/2000 |
| EP | 1 089 572 A2 | 4/2001 |
| EP | 1089201 | 4/2001 |
| EP | 1089571 | 4/2001 |
| WO | WO-97/26729 | 7/1997 |
| WO | WO-99/44159 | 9/1999 |
| WO | WO-99/65237 | 12/1999 |
| WO | WO-00/01149 | 1/2000 |
| WO | WO 00/59204 | 10/2000 |
| WO | WO-00/64165 | 10/2000 |
| WO | WO-01/15449 | 3/2001 |
| WO | WO-01/15451 | 3/2001 |
| WO | WO-01/17195 | 3/2001 |
| WO | WO-01/72042 | 9/2001 |
| WO | WO-01/93524 | 12/2001 |
| WO | WO-02/48863 | 6/2002 |
| WO | WO-02/103940 | 12/2002 |
| WO | WO-02/103941 | 12/2002 |
| WO | WO-02/104030 | 12/2002 |
| WO | WO-02/104031 | 12/2002 |
| WO | WO-03/028381 | 4/2003 |
| WO | WO-03/030540 | 4/2003 |
| WO | WO-03/061245 | 7/2003 |

OTHER PUBLICATIONS

"Competitive Differences. ReplayTV Rules. Here's why . . . ", Webpages. <URL: http://www.replaytv.com/overview/differences.htm, ReplayTV, (Mar. 21, 2000),1-2.

"Digital Video Broadcasting (DVB); Specification for Service Information (SI) in DVB Ssystems", *ETSI EN 300 468 V1.4.1*, European Standard (Telecommunications series),(Nov. 2000),1-85.

"Enhanced Digital Broadcast", Webpages. <URL: http://www.developer.intel.com/ial/home/digentertain/edg.htm, IAL Digital Entertain Initiative,(Aug. 21, 2001),1-3.

"Features", Webpage <URL http://www.replaytv.com/overview/features.htm, ReplayTV,(Mar. 21, 2000),1-2.

"Features Benefits", Webpages. <URL http://www.replaytv.com/overview/details.htm, ReplayTV,(Mar. 21, 2000),1-3.

"Frequently Asked QUESTIONS", Webpages. <URL http://www.tivo.com//what/faq_sub.html, TiVo.com,(Mar. 21, 2000),1-9.

"Frequently Asked Questions. Will ReplayTV make more popular? And other frequently asked questions.", Webpages. <URL http://www.replaytv.com/overview/faqs.htm,ReplayTV,(Mar. 21, 2000),1-4.

"Internet and Broadcast: The Key to Digital Convergence. Utilizing Digital Technology to Meet Audience Demand", *Intel Architecture Labs Digital Entertainment Initiative*, (2000),1-4.

"PCT International Search Report", Appl. No. PCT/US01/43862, Mailed Dec. 4, 2003,1-4.

"PCT International Search Report", Appl. No. PCT/US02/17270, Mailed Jun. 3, 2003,1-4.

"PCT International Search Report", Appl. No. PCT/US02/17381, Mailed Oct. 20, 2003,1-6.
"PCT International Search Report", Appl. No. PCT/US02/17316, Mailed Nov. 6, 2002,1-8.
"PCT International Search Report", Appl. No. PCT/US02/29099, Mailed Mar. 28, 2003,1-7.
"PCT International Search Report", Appl. No. PCT/US03/00169, Mailed Jun. 2, 2003,1-7.
"Program and System Information Protocol for Terrestrial Broadcast and Cable (Revision A) and Amendment No. 1", *Advanced Television Systems Committee*, Originally Published Dec. 27, 1997,(May 31, 2000),i-iii, 1-135.
"Technical Specifications", Webpages. <URL: http://www.replaytv.com/overview/techspecs.htm, ReplayTV, (Mar. 21, 2000),1.
"What is ReplayTV? Introducing the new ReplayTV 2020", Webpage. <URL: http://www.replaytv.com/overview/index.htm, ReplayTV, (Mar. 21, 2000),1.
"What is TiVo? Introduction to TiVo. A Better Way to Watch TV", Webpage. <URL http://www.tivo.com/what/intro.html, TiVo.com,(Mar. 21, 2000),1.
"What is TiVo? How TiVo Works. PRODUCT Specifications", Webpage. <URL http:/www.tivo.com//what/how2.html, TiVo.com,(Mar. 21, 2000),1.
"What is TiVo? How TiVo Works. What You Want, When You Want It", Webpage. <URL http://www.tivo.com/what/how.html, TiVo.com,(Mar. 21, 2000),1.
"What is TiVo? Introduction TiVo. Channel SURF in a Whole New Way", Webpage. <URL http://www.tivo.com/what/intro4.html, TiVo.com,(Mar. 21, 2000),1.
"What is TiVo? Introduction TiVo. Control Live TV", Webpage. <URL http://www.tivo.com/what/intro2.html, TiVo.com,(Mar. 21, 2000),1.
"What is TiVo? Introduction TiVo. Something GOOD is Always On", Webpage. <URL http://www.tivo.com/what/intro3.html, TiVo.com,(Mar. 21, 2000),1.
"What is TiVo? Introduction TiVo. DIGITAL Recordings without the Tape", Webpage. <URL http://www.tivo.com//what/intro5.html, TiVo.com,(Mar. 21, 2000),1.
"White Paper, Internet Protcol (IP) Multicast Technology Overview", Webpages, <URL: http:www.cisco.com/warp/public/cc/pd/iosw/tech/ipmu_ov.htm, Cisco Systems, Inc., (Jun. 29, 2001),1-16.
Gumalla, Ajay Chandra V., "An Access Protcol for a Wireless Home Network", *IEEE*, Wireless Communications and Networking Conference, Sep. 21, 1999, (1999),1392-1396.
Hartwig, Stephen, et al., "Broadcasting and Processing of Program Guides for Digital TV", *SMPTE Journal, SMPTE, Inc., vol. 106, No. 10*, Scarsdale, NY, XP000668926,(Sep. 1997),727-732.
Haskell, Barry G., et al., "Digital Video: An Itroduct to MPEG-2", *Digital Multimedia Standards Series*, Chapman & Hall,(1977),cover, 280-283.
Haubner, DR. P., et al., "Netzdienste fur Multimediale Anwendeungen CSCW—MBone", *Teleseminar: Multimedia Systeme—Technologie and Gestaltung WS 95/96*, XP002248684,(1996),1-20.
Holfeder, Wielland, "Interactive Remote Recording and Playback of Multicast Videoconferences", XP002088645,(Sep. 10, 1997),450-463.
Hu, Qinglong, et al., "Power Conservative Multi-Attribute Queries on Data Broadcast", *IEEE*, Data Enginneering, 16th International Confererence, San Diego, Calif.,(2000),157-177.
Hwang, Ren-Hung, et al., "Scheduling Policies for an VOD System over CATV Networks", *IEEE*, Department of Computer Science & Information Engineering,(1997),438-442.
Smyth, Barry, et al., "A Personalized TELEVISION Listings Service", *Communications of the ACM*, vol. 43, No. 8,(Aug. 2000),107-111.
Wittig, Hartmut, et al., "Intelligent Media Agents in Interactive Television Systems", *IEEE*, Proceedings of the Int'l Conf. on Multimedia Computing and Systems, Los Angeles, CA XP000603484, (May 15, 1998), 182-189.
Information Technology—Generic Coding of Moving Pictures and Associated Audio: Systems, Recommendation H.222.0, ISO/IEC 13818-1, Nov. 13, 1994.
PCT Int'l Search Report, Int'l App. No. PCT/IS 02/29091, mailed Apr. 3, 2003.

* cited by examiner

FIG. 1

REGIONAL FACTORS

| TERRAIN INCLUDING MOUNTAINS, HILLS AND TREES |
| SIGNAL REFLECTIONS OFF BUILDINGS OR OTHER STRUCTURES |
| EMF INTERFACE |
| MICROWAVE INTERFERENCE |
| RADIO FREQUENCY INTERFERENCE |
| MIXING (CHANNEL OVERLAP OR FREQUENCY SEPARATION) OF AN INTERFERING SIGNAL WITH THE DESIRED SIGNAL RESULTING IN INTERMODULATION AND ADDED NOISE |

200

DYNAMIC FACTORS

| WEATHER |
| STORMS |
| HUMIDITY |
| SEASONAL VARIATIONS |

220

RETRANSMISSION FACTORS

| FROM TRANSMITTER TO TRANSMITTER TO SET-TOP BOX |
| FROM TRANSMITTER TO SATELLITE TO TERRESTRIAL SET-TOP BOX |
| FROM TRANSMITTER TO SATELLITE TO TRANSMITTER TO SET-TOP BOX |

ERROR CORRECTION POLICY APPLICATION

CONTROLS AND OPTIMIZES BANDWIDTH AND QUALITY OF SERVICE (QOS) OF A GIVEN BROADCAST BASED ON REGIONAL FACTORS INCLUDING TERRAIN, DYNAMIC FACTORS INCLUDING WEATHER AND SEASON, AND RETRANSMISSION FACTORS

COMPARES THE TRANSMITTED DATA ERRORS TO AT LEAST ONE OF THE PREDETERMINED TOLERABLE TRANSMITTED DATA ERROR LEVEL AND A PREDETERMINED TOLERABLE TRANSMITTED DATA ERROR LEVEL FOR A PREDETERMINED TIME PERIOD

UTILIZES ERROR CORRECTION CODING AND ERROR DETECTION CODING

UTILIZING FORWARD ERROR CORRECTION (FEC)

DYNAMICALLY ADJUSTS ERROR CORRECTION LEVELS

UTILIZES CONVOLUTIONAL (TREE) CODES AND BLOCK CODES

MEASURES BIT ERROR RATES IN TERMS OF QUANTITY OF BIT ERRORS OCCURRING OVER SOME UNIT OF TIME

NO OTHER ERROR ANALYSIS INPUT IS REQUIRED FOR ERROR CORRECTION OTHER THAN ERROR REPORTING BY THE SET-TOP BOX

ERROR CORRECTION FOR REGIONAL AND DYNAMIC FACTORS IN COMMUNICATIONS

FIELD

This invention relates to transmitting data, more particularly, employing a receiver feedback for error correction of data transmission for interference caused by factors including regional factors, and dynamic factors.

BACKGROUND

In the deployment of large scale content broadcasting, poor or unsatisfactory data reception caused by interference factors in the path of the transmitting data between a transmitter and a receiver is a usual issue. This concern is applicable to both analog and digital signals, including the digital television transmission (DTV) formats such as the recently available high definition television (HDTV) and standard definition television (SDTV) having technical standards established by the American Television Systems Committee (ATSC), an international organization.

Broadcast systems traditionally transmit data in one direction from a server system to a plurality of client systems. Consumers of the client systems typically receive the signals from the server system as they are broadcast. Currently, error correction practices are utilized that increase the reliability of the reception of transmitted data including forward error correction (FEC) techniques and carouselling (retransmission of the same data), convolutional (tree) codes and block codes. FEC, however, is not useful with analog communications because the degradation of analog signals cannot be effectively corrected. Often these various error correction techniques are employed to handle transmission errors but show unsatisfactory results since there are often a myriad of data transmission interference factors. Some interference factors are regional such as terrain existing along the path of the data transmission, and other factors are dynamic based on environmental factors including weather and season. Retransmission factors are a further consideration such that data can be transmitted to many locations, each having different regional and dynamic factors. For example, satellite communications systems use orbiting satellites as radio repeaters to relay signals between earth stations. Most telecommunications satellites in use today are in geostationary orbit about 22,300 miles above the equator. Satellite systems can be used for one-way, two-way, point-to-point or point-to-multipoint transmission of various types of signals, including voice, data and video. Further, interference can occur in the up-link transmission from earth station to satellite, or in the down-link from satellite to earth.

Currently, there is a need for control and optimization of bandwidth and Quality of Service (QOS) of a given broadcast based on regional factors including terrain, and transient conditions including weather that effect the level of service to the end client (i.e. the receiver). QOS is currently a significant concern for continuous transmission of high-bandwidth video and multimedia information.

BRIEF DESCRIPTION OF THE DRAWINGS

Additional advantages of the invention will become apparent upon reading the following detailed description and upon reference to the drawings, in which.

DETAILED DESCRIPTION

Exemplary embodiments are described with reference to specific configurations. Those of ordinary skill in the art will appreciate that various changes and modifications can be made while remaining within the scope of the appended claims. Additionally, well-known elements, devices, components, circuits, process steps and the like are not set forth in detail in order to avoid obscuring the present invention.

In an embodiment, the invention provides error correction of data transmission in communications, utilizing a receiver feedback, for data transmission interference caused by regional factors including terrain, dynamic factors including weather and season, and retransmission factors.

In an embodiment, a method and system is provided that controls Quality of Service (QOS), a guaranteed and specified networking throughput level, by tracking and reporting data transmission errors utilizing a feedback from a receiver to a transmitter (i.e. from a set-top box to a broadcast center server). Transmission rates, error rates and other characteristics are measured, improved, and to some extent guaranteed in advance.

In an embodiment, the invention provides a method and apparatus for tracking and reporting data transmission errors irregardless of the cause of the data interference. The reported data transmission errors are analyzed to determine whether a tolerable level is exceeded. Error correction is applied if the tolerable level is exceeded. In an embodiment, the invention provides increased reliability of data transmission (for both analog and digital data transmission) between a transmitter and a receiver, as compared to currently used systems. In an embodiment, no other error analysis input is required for the data transmitter error correction, other than error reporting by the set-top box.

Figure 1:
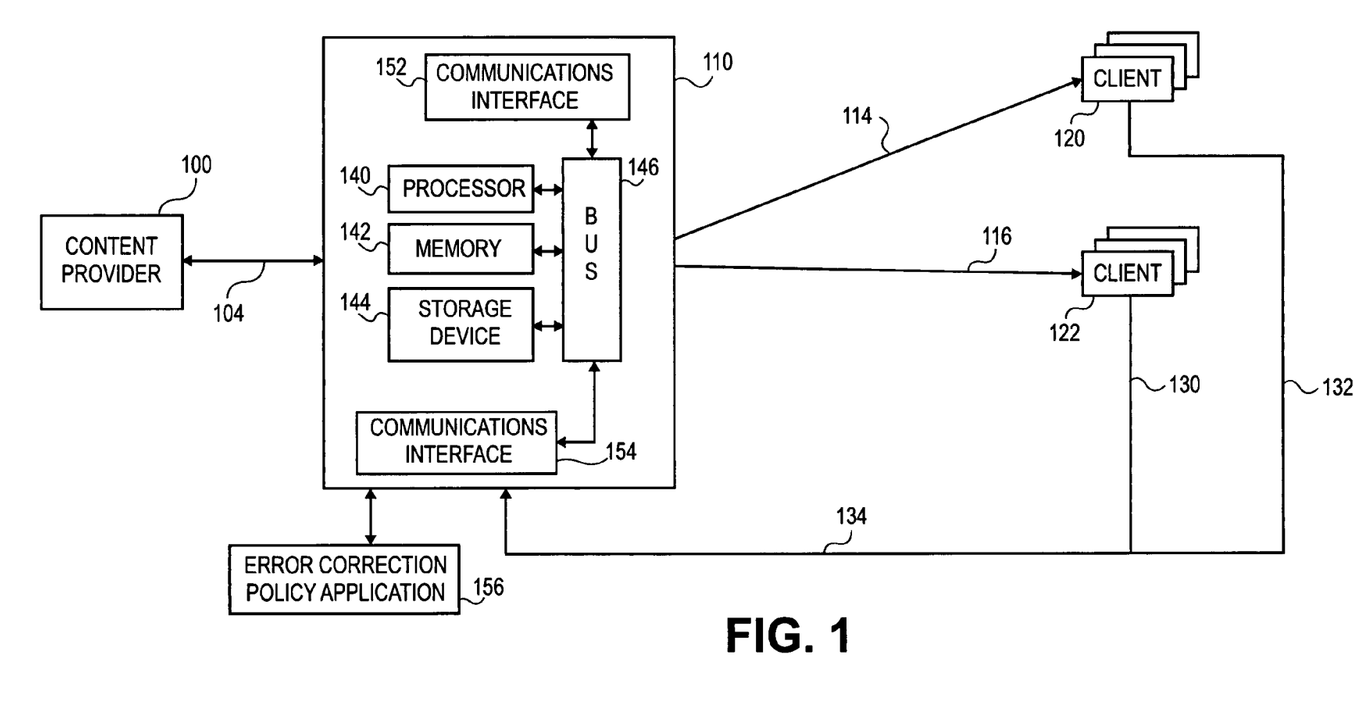
FIG. 1 is a representation of a content provider, a broadcast center server, an error correction policy application, and a receiving client depicting a feedback, in an embodiment of the invention.

FIG. 1 is a representation of a content provider, a broadcast center server, an error correction policy application, and a receiving client depicting a feedback, in an embodiment of the invention. In an embodiment, at least one content provider 100 provides a product to a broadcast center server 110. Content provider 100 provides the product in at least one of an analog and a digital format. In an embodiment, content provider 100 hand delivers the product via physical tape to broadcast center server 110. Content provider 100 can be a server computer, a group, a subnetwork, a local area network (LAN) or other group of multiple computers. The product can be a television program, movie, short, raw data, voice, audio, video, graphics, common data, or some combination of these or other similar data. In an embodiment, content provider 100 provides the product via connection 104. In an embodiment, connection 104 is a land line such as T1 lines, T3 lines, coaxial cable, Ethernet, twisted-pair, fiber optic such as a Synchronous Optical Network (SONET), or other physically present connection. In another embodiment, connection 104 is wireless in the form of microwave, satellite, radio waves, and the like. Yet in another embodiment, connection 104 is a hand delivery of a product such as a physical tape delivered via a common carrier including the U.S. Postal Service or commercial carriers such as UPS or Federal Express.

In an embodiment, broadcast center server 110 receives the product from content provider 100 via connection 104. In an embodiment, broadcast center server 110 is a server computer or a group of computers including a subnetwork, cluster or a LAN. Broadcast center server 110 distributes the product to consumers such as clients 120 and 122.

In an embodiment, broadcast center server 110 utilizes Asynchronous Transfer Mode (ATM) to transfer data in cells or packets of a fixed size. In an embodiment, the ATM creates a fixed channel between broadcast center server 110 and clients 120 and 122 when the transfer of data begins. In another embodiment, each packet is transmitted individually and can follow different routes to its destination. After receiving the packets, clients 120 and 122 recompile the packets into the original message. In an embodiment, by utilizing ATM, high-speed (up to 2.5 gigabits) switching service capable of carrying voice, data, video and multimedia images is provided. This allows ATM providers to guarantee to their customers that end-to-end latency will not exceed a specified level.

In an embodiment, the products sent to the clients are sent in a digital format. In an embodiment, broadcast center server 110 is comprised of one or more server computers that include a processor 140, a memory 142 such as any Random Access Memory (RAM) device, a storage device 144 to store data received from the content providers and clients, and at least one communications interface 152. In an embodiment, multiple communications interfaces 152 and 154 are utilized for communication with content providers as already described, and for communication with clients as will be described below. Storage device 144 can be any machine-readable medium including hard disk drives, optical disk drives, magnetic tape, etc.

Software implementing the methods described herein can be stored on storage device 144 or other machine-readable medium included in broadcast center server 110, including magnetic and optical disks; magnetic tape; read-only memory (ROM), programmable read-only memory (PROM), electronically erasable programmable memory (EEPROM), and similar semiconductor devices; or can be downloaded from any external or remote device via electrical, acoustical, or other form of propagated signal (e.g., carrier waves, digital signals, infrared signals, etc.).

In an embodiment, processor 140, memory 142, storage device 144, and communications interfaces 152 and 154 are coupled via bus 146. In an embodiment, broadcast center server 110 includes multiple or additional communications interfaces, processors, storage devices, display adapters, and buses. In an embodiment, broadcast center server 110 includes multiple server computers that can be dedicated communications servers, applications servers, storage servers, and other specialized servers configured as a LAN, group, subgroup, cluster, subnetwork, and the like.

In an embodiment, clients 120 and 122 that receive products are a computing device such as a set-top box, personal computer, portable computer, cellular telephone, personal digital assistant (PDA), computing tablet, or any other device containing a processor with a communications interface that allows for the receipt of data distributed via connections 114 and 116. In an embodiment, the set-top box utilizes a TCP/IP communications stack. In one embodiment, the set-top box is attached to a service through a telephone line or through a cable TV company. In an embodiment, the set-top box contains one or more processors for running the operating system, and for parsing the MPEG standards transport stream. In an embodiment, the set-top box includes RAM, an MPEG decoder chip, and more chips for audio decoding and processing. The set-top box can also be DVB-compliant to decode COFDM transmissions or ATSC-compliant to decode VSB transmissions.

In an embodiment, clients 120 and 122 receive broadcast products wirelessly via a conventional ground terrestrial transmission, via a digital television (DTV) connection 114, via satellite connection 116 and via a wide area network (WAN) connection. The WAN can be the Internet. In another embodiment, clients 120 and 122 receive broadcast product via cable television (CATV) connection. In an embodiment, a CATV connection is a WAN. The DTV connection display formats is one of High Definition Television (HDTV) and Standard Definition Television (SDTV). In an embodiment, clients 120 and 122 receive 8-level vestigial sideband (8-VSB) format chosen by the ATSC for the broadcast of DTV.

In an embodiment, clients 120 and 122 also send information to broadcast center server 110. For clients 120 and 122 that receive broadcast products via a satellite, radio wave or other wireless connection, communication to the broadcast center 110 can be achieved via telephone dial-up connection through a WAN, such as, for example, by connecting over the Internet. In other embodiments, clients 120 and 122 dial-up directly to broadcast center server 110. In an embodiment, connection 130 represents a connection through a WAN to broadcast center server 110, and connection 132 represents a direct dial-up connection to broadcast center server 110. In an embodiment, connections 130 and 132 join to connection 134 and further connect to broadcast center server 110.

In an embodiment, when a product is sent by broadcast center server 110 to clients 120 and 122, clients 120 and 122 having software, track and report data errors regarding the received product. The tracked data errors are reported back to broadcast center server 110, automatically and transparently, without any user input. In an embodiment, data transmission errors are continuously tracked by clients 120 and 122. In an embodiment broadcast center server 110 assigns a predetermined tolerable transmitted data error level to clients 120 and 122. On the first occasion that the predetermined tolerable data level is determined and assigned, clients 120 and 122 have previously reported a transmitted data error level to broadcast center server 110. Thereafter, a different predetermined tolerable transmitted data error level can be periodically reassigned as clients 120 and 122 report transmitted data error levels (further described hereinafter). In an embodiment, the errors include errors caused by regional factors including terrain, dynamic factors including weather and season, and retransmission factors.

In an embodiment, the tolerable transmitted data error level is additionally based on the number of clients 120 and 122 that are located in a geographical area having the same or similar regional and dynamic characteristics. That is, for example, a first tolerable transmitted data error level is assigned to a first group of set-top boxes having a similar regional and dynamic environment, and a second tolerable transmitted data error level is assigned to a second group of set-top boxes having a similar regional and dynamic environment (but different environment than the first group).

In an embodiment, clients 120 and 122 identify data errors that exceed the predetermined tolerable transmitted data error level. In another embodiment, clients 120 and 122 identify data errors that exceed the predetermined tolerable transmitted data error level for a predetermined time. After identifying the errors, clients 120 and 122 report the errors to broadcast center server 110. In another embodiment, a predetermined tolerable transmitted data error level is not assigned to clients 120 and 122, and data errors are continuously reported by clients 120 and 122 to broadcast center server 110. In an embodiment, the continuous reporting is accomplished at a predetermined periodic rate. In an embodiment, an identification of clients 120 and 122 is transmitted to broadcast center server 110 with the reported transmitted data error level.

Figure 2:
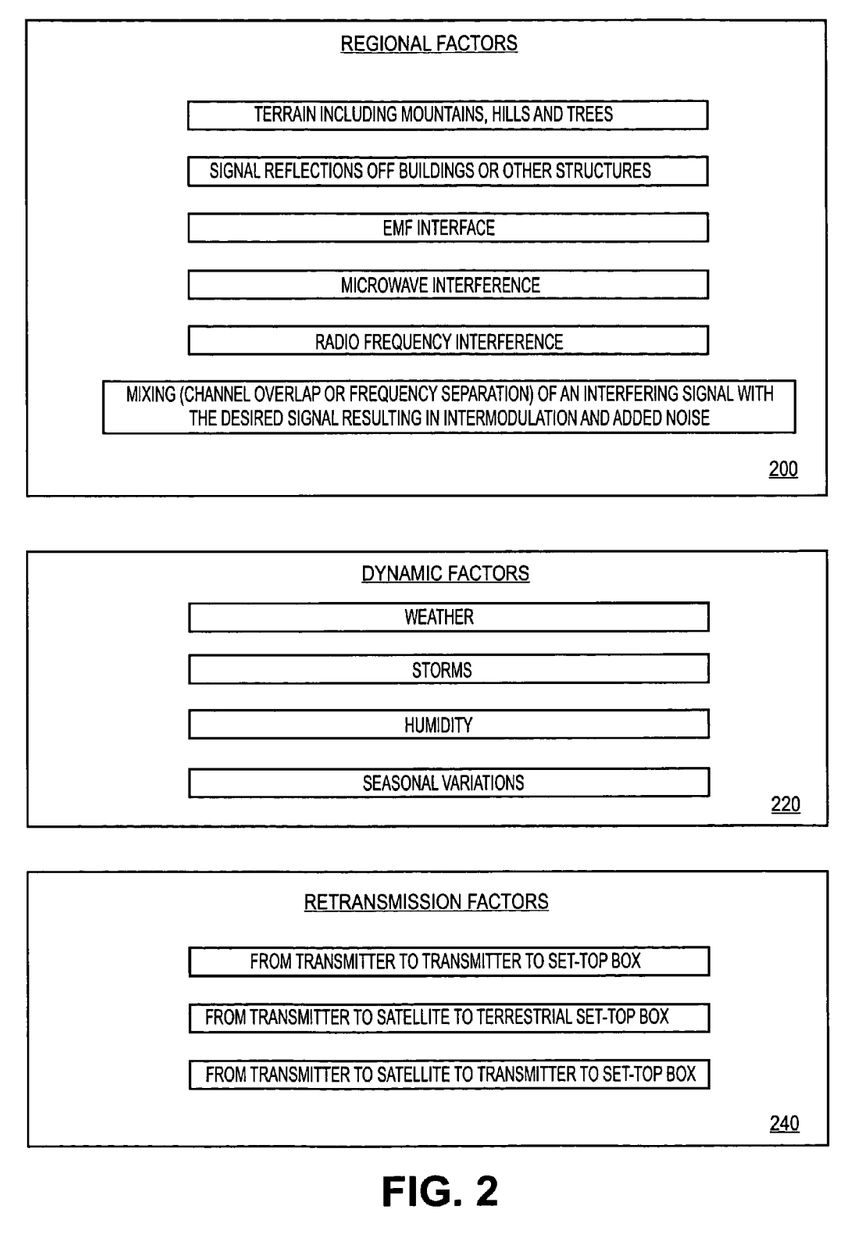
FIG. 2 depicts a partial listing of regional factors, dynamic factors and retransmission factors that can cause transmission interference.

FIG. 2 depicts a partial listing of regional factors, dynamic factors and retransmission factors that can cause transmission interference. Transmission interference can be caused during transmission between broadcast center server 110 and one of clients 120 and 122 while utilizing one of digital television connection 114, satellite connection 116, and connections 130, 132, and 134. As presented in block 200, the regional factors comprise terrain including mountains, hills and trees. Other regional factors include signal reflections off buildings or other structures, EMF interference, microwave interference, radio frequency interference and mixing (channel overlap or frequency separation) of an interfering signal with the desired signal resulting in intermodulation and added noise. As presented in block 220, the dynamic factors include weather, storms, humidity and seasonal variations. As presented in block 240, the retransmission factors include transmission from transmitter to transmitter to set-top box, transmission from transmitter to satellite to terrestrial set-top box, and transmission from transmitter to satellite to transmitter to set-top box. In an embodiment, clients 120 and 122 track and report at least one of regional factors, dynamic factors, and retransmission factors. The regional factors can include one or all of those described. The dynamic factors and the retransmission factors can include one or all of those described. For example, the regional factors tracked and reported can include only trees.

In an embodiment, broadcast center server 110 analyzes the reported data errors. The analysis includes comparing the transmitted data errors to at least one of a predetermined tolerable transmitted data error level and a predetermined tolerable transmitted data error level for a predetermined time period.

Figure 3:
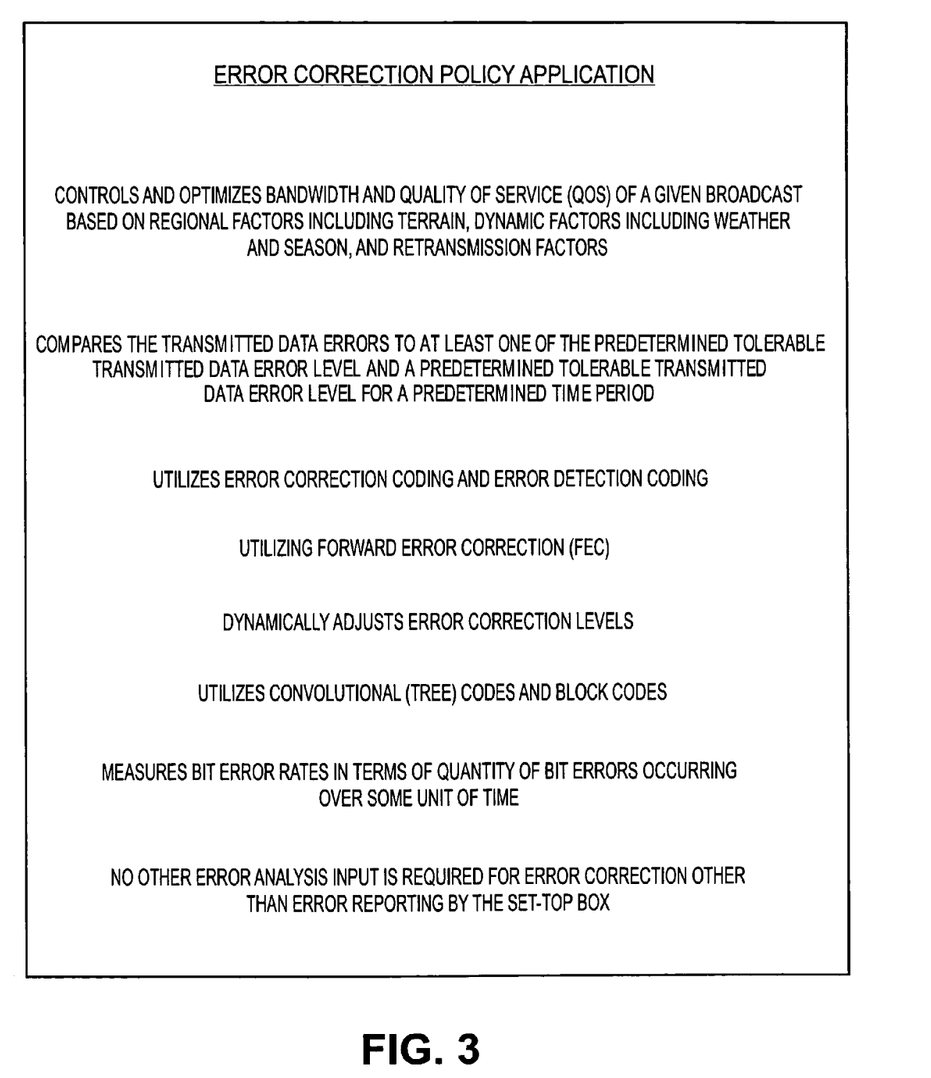
FIG. 3 is a method diagram depicting Error Correction Policy Application functions, in an embodiment of the invention.

In an embodiment, broadcast center server 110 includes error correction policy application 156. The functions, in an embodiment of the invention, of Error Correction Policy Application are shown in FIG. 3. In an embodiment, error correction policy application 156 is wirelessly connected to, and separate from broadcast center server 110. Error correction policy application 156 is referred to in the appended claims as a "device", and when the appended claims refer to the device being "coupled to the receiver", it is intended that a variety of couplings can be employed such as a wireless coupling. In an embodiment, error correction policy application 156 decreases the transmitted data error level by adjusting error correction of transmitted data based on the reported transmitted data error level. In an embodiment, error correction of transmitted data is applied dynamically. By dynamically adjusting a level of error correction it is meant that the adjusting is applied continuously in response to when the transmitted data error level exceeds the predetermined tolerable error level, rather than at designated intervals of, for example, every hour.

In an embodiment, at least one of error correction coding and error detection coding is utilized. In an embodiment, error correction policy application 156 utilizes at least one of convolutional (tree) codes and block codes. In an embodiment, broadcast center server 110 includes processor 140 that executes a decoding algorithm to decode convolutional codes. In an embodiment, errors are analyzed by measuring the bit error rate in terms of the number of bit errors divided by the total bits transferred. In an embodiment, the bit error rate is measured in terms of quantity of bit errors occurring over some unit of time.

By error correcting the data transmission in an embodiment of the invention, bandwidth is increased, the amount of data that is transmitted in a fixed amount of time, since the effects of regional factors and dynamic factors are reduced. In an embodiment, error correction policy application 156 utilizes Forward Error Correction (FEC) and adds check bits to the data stream, thereby increasing the transmission reliability. Clients 120 and 122 analyze the check bit information to locate and correct errors. After correcting errors, however, clients 120 and 122 report errors to broadcast center server 110.

Figure 4:
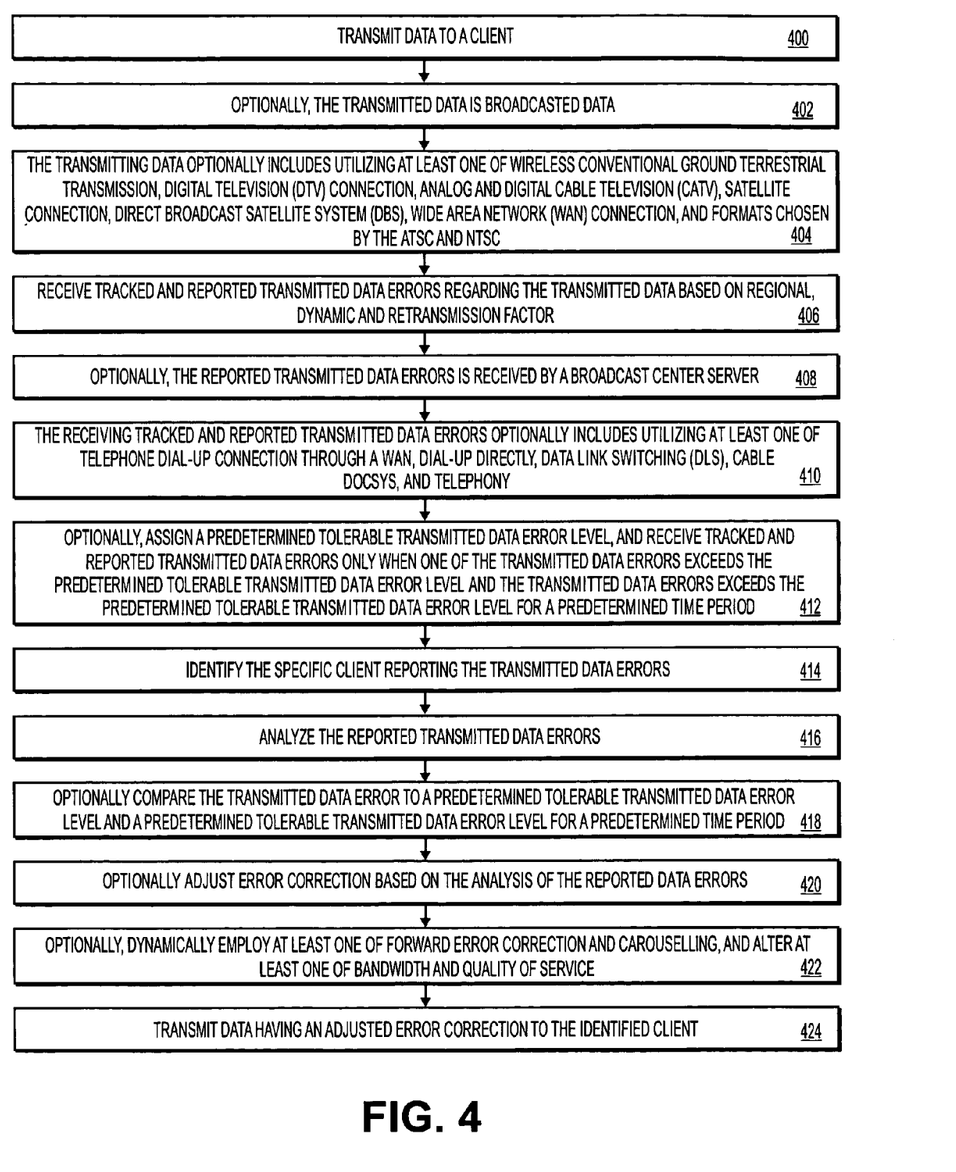
FIG. 4 is a method diagram depicting transmitter methods, in an embodiment of the invention.

FIG. 4 is a method diagram depicting methods of a transmitter, in an embodiment of the invention. In an embodiment, the transmitter is broadcast center server 110. In an embodiment, Broadcast center server 110 transmits data to a client, as shown in method block 400. Optionally, the transmitted data is broadcasted data, as shown in method block 402. The transmitting data optionally includes utilizing at least one of wireless conventional ground terrestrial transmission, digital television (DTV) connection, analog and digital cable television (CATV), satellite connection, direct broadcast satellite system (DBS), wide area network (WAN) connection, and formats chosen by the ATSC and National Television Standards Committee (NTSC), as shown in method block 404.

Broadcast center server 110 receives tracked and reported transmitted data errors regarding the transmitted data based on regional, dynamic and retransmission factors, as shown in method block 406. Optionally, the reported transmitted data errors is directly received by broadcast center server 110, as shown in method block 408. The received tracked and reported transmitted data errors optionally includes utilizing at least one of telephone dial-up connection through a WAN, dial-up directly, data link switching (DLS), cable docsys, and telephony, as shown in method block 410. In an embodiment, broadcast center server 110 optionally assigns a predetermined tolerable transmitted data error level and receives tracked and reported transmitted data errors only when one of the transmitted data errors exceeds the predetermined tolerable transmitted data error level and the transmitted data errors exceeds the predetermined tolerable transmitted data error level for a predetermined time period, as shown in method block 412. Broadcast center server 110 identifies the specific client reporting the transmitted data errors, as shown in method block 414.

Broadcast center server 110 analyzes the reported transmitted data errors, as shown in method block 416. The transmitted data errors is optionally compared to a predetermined tolerable transmitted data error level and a predetermined tolerable transmitted data error level for a predetermined time period, as shown in method block 418. Error correction is optionally adjusted based on the analysis of the reported data errors, as shown in method block 420. Optionally, broadcast center server 110 dynamically employs at least one of forward error correction and carouselling, and alters at least one of bandwidth and quality of service, as shown in method block 422. Data is transmitted to the client having an adjusted error correction to the identified client, as shown in method block 424.

Figure 5:
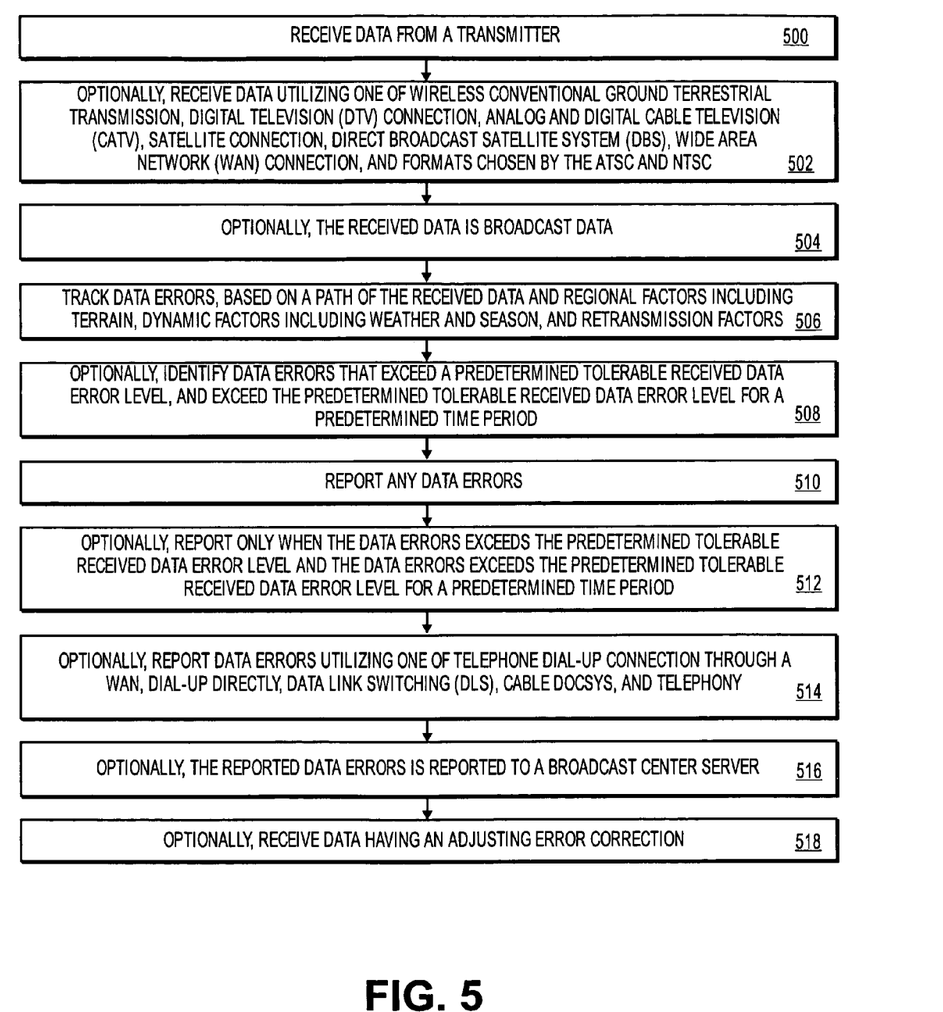
FIG. 5 is a method diagram depicting receiver methods, in an embodiment of the invention.

FIG. 5 is a method diagram depicting receiver methods, in an embodiment of the invention. In an embodiment, the receiver is a client such as a set-top box, for example clients 120 and 122. Clients 120 and 122 receive data from a transmitter, as shown in method block 500. Optionally, clients 120 and 122 receive data utilizing one of wireless conventional ground terrestrial transmission, digital television (DTV) connection, analog and digital cable television (CATV), satellite connection, direct broadcast satellite system (DBS), wide area network (WAN) connection, and formats chosen by the ATSC and NTSC, as shown in method block 502. Optionally, the received data is broadcast data, as shown in method block 504. Clients 120 and 122 track data errors, based on a path of the received data and regional factors including terrain, dynamic factors including weather and season, and retransmission factors, as shown in method block 506.

Optionally, clients 120 and 122 identify data errors that exceed a predetermined tolerable received data error level, and exceed the predetermined tolerable received data error level for a predetermined time period, as shown in method block 508. Any data errors reported, as shown in method block 510. Optionally, data errors are reported only when the data errors exceed the predetermined tolerable received data error level and the data errors exceed the predetermined tolerable received data error level for a predetermined time period, as shown in method block 512. Optionally, data errors are reported utilizing one of telephone dial-up connection through a WAN, dial-up directly, data link switching (DLS), cable docsys, and telephony, as shown in method block 514. Optionally, the reported data errors is reported to a broadcast center server, as shown in method block 516. Optionally, clients 120 and 122 receive data having an adjusted error correction, as shown in method block 518.

In an embodiment of the invention, a machine-readable medium is provided, the machine-readable medium having instructions that when executed by a processor cause the processor to perform operations. In an embodiment, the operations include at least one of the methods as discussed herein with reference to FIG. 3 and FIG. 4. In an embodiment, the methods as discussed herein with reference to FIG. 3 and FIG. 4 are embodied in machine-executable instructions. The instructions can be used to cause a general-purpose or special-purpose processor that is programmed with the instructions to perform the methods of an embodiment of the invention. Alternatively, the methods of an embodiment of the invention can be performed by specific hardware components that contain hardwired logic, or by any combination of programmed computer components and custom hardware components.

The machine-readable storage medium includes any mechanism that provides (i.e., stores and/or transmits) information in a form readable by a machine (e.g., a computer). For example, a machine-readable medium includes floppy diskettes, optical disks, compact disc, Read-Only Memory (CD-ROMs), and magneto-optical disks, Read-Only Memory (ROMs), Random Access Memory (RAMs), Erasable Programmable Read-Only Memory (EPROMs), Electrically Erasable Read-Only Memory (EEPROMs), magnetic disk storage media, optical storage media, flash memory devices, electrical, optical, acoustical or other form of propagated signals (e.g., carrier waves, infrared signals, digital signals, etc.), and other type of media/machine-readable medium suitable for storing electronic instructions, etc.

Having disclosed exemplary embodiments and the best mode, modifications and variations can be made to the disclosed embodiments while remaining within the spirit and scope of the invention as defined by the appended claims.

What is claimed is:

1. A method comprising:
   transmitting data to at least one client;
   receiving, from the at least one client, tracked and reported transmitted data errors, based on a path of the transmitting data and at least one of regional factors, dynamic factors, and retransmission factors;
   the at least one client reporting the transmitted data errors; and
   the transmitted data errors.

2. The method of claim 1, further comprising:
   adjusting error correction based on the analyzing the transmitted data errors; and
   transmitting data, having an adjusted error correction, to the at least one client.

3. The method of claim 2, wherein the adjusting comprises employing at least one of forward error correction and carouselling, and altering at least one of bandwidth and quality of service.

4. The method of claim 2, wherein the adjusting error correction comprises dynamically regulating error correction.

5. The method of claim 1, wherein the transmitting data comprises data, and wherein the receiving tracked and reported transmitted data errors comprises receiving by.

6. The method of claim 1, wherein the analyzing the transmitted data errors comprises comparing the transmitted data errors to at least one of a predetermined tolerable transmitted data error level and a predetermined tolerable transmitted data error level for a predetermined time period.

7. The method of claim 1, further comprising:
   assigning a predetermined tolerable transmitted data error level;
   wherein the receiving tracked and reported transmitted data errors comprises receiving only when one of the transmitted data errors exceeds the predetermined tolerable transmitted data error level and the transmitted data errors exceeds the predetermined tolerable transmitted data error level for a predetermined time period.

8. The method of claim 1, wherein the transmitting data comprises utilizing at least one of wireless conventional ground terrestrial transmission, digital television (DTV) connection, analog and digital cable television (CATV), satellite connection, direct broadcast satellite system (DBS), wide area network (WAN) connection, and formats chosen by the Advanced Television Systems Committee (ATSC) and National Television Standards Committee (NTSC).

9. The method of claim 1, wherein the receiving tracked and reported transmitted data errors comprises utilizing at least one of telephone dial-up connection through a WAN, dial-up directly, data link switching (DLS), cable docsys, and telephony.

10. An apparatus comprising:
    a transmitter to transmit data to at least one client;
    a receiver to receive, from the at least one client, tracked and reported transmitted data errors regarding the transmitted data based on a path of the transmitted data and at least one of regional factors, dynamic factors, and retransmission factors; and
    a device coupled to the receiver to identify the at least one client reporting the transmitted data errors and to analyze the transmitted data errors.

11. The apparatus of claim 10, wherein the transmitter transmits broadcasting data, and wherein the device is a broadcast center server.

12. The apparatus of claim 10, wherein the device adjusts error correction based on the analysis of the transmitted data errors, and transmits data having the adjusted error correction, to the at least one client.

13. The apparatus of claim 12, wherein the device dynamically employs at least one of forward error correction and carouselling, and alters at least one of bandwidth and quality of service.

14. The apparatus of claim 10, wherein the device to analyze the transmitted data errors compares the transmitted data errors to at least one of a predetermined tolerable transmitted data error level and a predetermined tolerable transmitted data error level for a predetermined time period.

15. The apparatus of claim 10, wherein the device assigns a predetermined tolerable transmitted data error level and the receiver receives tracked and reported transmitted data errors only when one of the transmitted data errors exceeds the predetermined tolerable transmitted data error level, and exceeds the predetermined tolerable transmitted data error level for a predetermined time period.

16. The apparatus of claim 10, wherein the transmitter transmits data utilizing at least one of wireless conventional ground terrestrial transmission, digital television (DTV) connection, analog and digital cable television (CATV), satellite connection, direct broadcast satellite system (DBS), wide area network (WAN) connection, and formats chosen by the Advanced Television Systems Committee (ATSC) and National Television Standards Committee (NTSC), and the receiver receives tracked and reported transmitted data errors utilizing at least one of telephone dial-up connection through a WAN, dial-up directly, data link switching (DLS), cable docsys, and telephony.

17. A machine-readable medium having instructions that when executed by a processor cause the processor to perform operations comprising:
transmitting data to at least one client;
receiving, from the at least one client, tracked and reported transmitted data errors regarding the transmitting data, based on a path of the transmitting data and at least one of regional factors, dynamic factors, and retransmission factors;
identifying the at least one client reporting the transmitted data errors; and
analyzing the transmitted data errors.

18. The machine-readable medium of claim 17, further comprising:
adjusting error correction based on the analyzing the transmitted data errors; and
transmitting data, having an adjusted error correction, to the at least one client.

19. The machine-readable medium of claim 18, wherein the adjusting comprises dynamically employing at least one of forward error correction and carouselling, and altering at least one of bandwidth and quality of service.

20. The machine-readable medium of claim 17, wherein the transmitting data comprises broadcasting data, and wherein the receiving tracked and reported transmitted data errors comprises receiving by a broadcast center server.

21. The machine-readable medium of claim 17, wherein the analyzing the transmitted data errors comprises comparing the transmitted data errors to at least one of a predetermined tolerable transmitted data error level and a predetermined tolerable transmitted data error level for a predetermined time period.

22. The machine-readable medium of claim 17, further comprising:
assigning a predetermined tolerable transmitted data error level;
wherein the receiving tracked and reported transmitted data errors comprises receiving only when one of the transmitted data errors exceeds the predetermined tolerable transmitted data error level and the transmitted data errors exceeds the predetermined tolerable transmitted data error level for a predetermined time period.

23. The machine-readable medium of claim 17, wherein the transmitting data comprises utilizing at least one of wireless conventional ground terrestrial transmission, digital television (DTV) connection, analog and digital cable television (CATV), satellite connection, direct broadcast satellite system (DBS), wide area network (WAN) connection, and formats chosen by the Advanced Television Systems Committee (ATSC) and National Television Standards Committee (NTSC), and wherein the receiving tracked and reported transmitted data errors comprises utilizing at least one of telephone dial-up connection through a WAN, dial-up directly, data link switching (DLS), cable docsys, and telephony.

24. A method comprising:
receiving data from a transmitter;
tracking data errors regarding the receiving data, based on a path of the receiving data and at least one of regional factors, dynamic factors, and retransmission factors; and
reporting the data errors to a receiver.

25. The method of claim 24, further comprising:
receiving data, from the transmitter, having an adjusted error correction.

26. The method of claim 24, wherein the receiving data comprises receiving broadcast data, and wherein the reporting data errors comprises reporting to a broadcast center server.

27. The method of claim 24, further comprising:
receiving an assigned predetermined tolerable received data error level;
wherein the tracking comprises identifying data errors that one of exceeds the predetermined tolerable received data error level, and exceeds the predetermined tolerable received data error level for a predetermined time period; and
wherein the reporting comprises reporting only when one of the data errors exceeds the predetermined tolerable received data error level and the data errors exceeds the predetermined tolerable received data error level for a predetermined time period.

28. The method of claim 24, wherein receiving data comprises utilizing at least one of wireless conventional ground terrestrial transmission, digital television (DTV) connection, analog and digital cable television (CATV), satellite connection, direct broadcast satellite system (DBS), wide area network (WAN) connection, and formats chosen by the Advanced Television Systems Committee (ATSC) and National Television Standards Committee (NTSC), and wherein reporting data errors comprises utilizing at least one of telephone dialup connection through a WAN, dial-up directly, data link switching (DLS), cable docsys, and telephony.

29. An apparatus comprising:
a receiver to receive data from a transmitter, and track and report received data errors to the transmitter, based on a path of data transmission and at least one of regional factors, dynamic factors, and retransmission factors.

30. The apparatus of claim 29, wherein the receiver receives data having one of error correction and an adjusted error correction based on the reported received data errors.

31. The apparatus of claim 29, wherein the receiver receives broadcast data from a broadcast center server.

32. The apparatus of claim 29, wherein the receiver receives an assigned predetermined tolerable received data error level.

33. The apparatus of claim 29, wherein the receiver identifies received data errors that one of exceeds the predetermined tolerable received data error level, and exceeds the predetermined tolerable received data error level for a predetermined time period.

34. The apparatus of claim 33, wherein the receiver reports only when one of the received data errors exceeds the predetermined tolerable received data error level and the received data errors exceeds the predetermined tolerable received data error level for a predetermined time period.

35. The apparatus of claim 29, wherein the receiver receives the data utilizing at least one of wireless conventional ground terrestrial transmission, digital television (DTV) connection, analog and digital cable television (CATV), satellite connection, direct broadcast satellite system (DBS), wide area network (WAN) connection, and formats chosen by the Advanced Television Systems Committee (ATSC) and National Television Standards Committee (NTSC), and reports the received data errors utilizing at least one of telephone dial-up connection through a WAN, dial-up directly, data link switching (DLS), cable docsys, and telephony.

36. A machine-readable medium having instructions that when executed by a processor cause the processor to perform operations comprising:
   receiving data from a transmitter;
   tracking data errors regarding the receiving data, based on a path of the receiving data and at least one of regional factors, dynamic factors, and retransmission factors; and
   reporting the data errors to a receiver.

37. The machine-readable medium of claim 36, further comprising:
   receiving data, from the transmitter, having an adjusted error correction.

38. The machine-readable medium of claim 36, wherein the receiving data comprises receiving broadcast data, and wherein the reporting data errors comprises reporting to a broadcast center server.

39. The machine-readable medium of claim 36, further comprising:
   receiving an assigned predetermined tolerable received data error level;
   wherein the tracking comprises identifying data errors that one of exceeds the predetermined tolerable received data error level, and exceeds the predetermined tolerable received data error level for a predetermined time period; and
   wherein the reporting comprises reporting only when one of the data errors exceeds the predetermined tolerable received data error level and the data errors exceeds the predetermined tolerable received data error level for a predetermined time period.

40. The machine-readable medium of claim 36, wherein receiving data comprises utilizing at least one of wireless conventional ground terrestrial transmission, digital television (DTV) connection, analog and digital cable television (CATV), satellite connection, direct broadcast satellite system (DBS), wide area network (WAN) connection, and formats chosen by the Advanced Television Systems Committee (ATSC) and National Television Standards Committee (NTSC), and wherein reporting data errors comprises utilizing at least one of telephone dial-up connection through a WAN, dial-up directly, data link switching (DLS), cable docsys, and telephony.

* * * * *